R. L. SANDERS.
WATER ELEVATOR AND DISTRIBUTER.
APPLICATION FILED APR. 23, 1909.
950,960.
Patented Mar. 1, 1910.
5 SHEETS—SHEET 4.
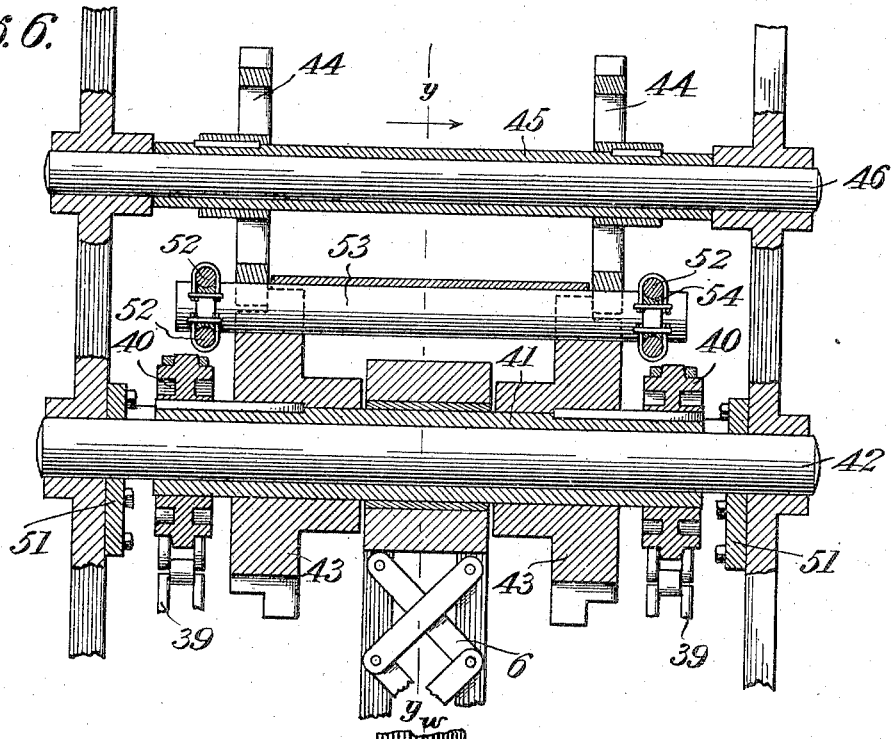
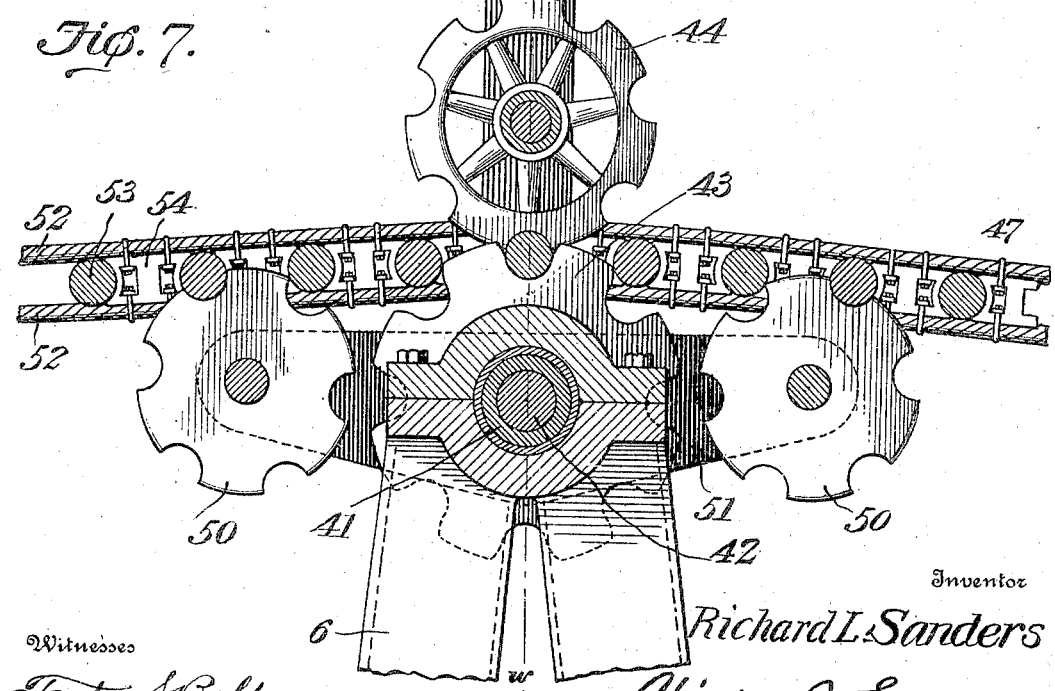
Witnesses
Fenton S. Belt
U. B. Hillyard.
Inventor
Richard L. Sanders
By Victor J. Evans
Attorney R. L. SANDERS.
WATER ELEVATOR AND DISTRIBUTER.
APPLICATION FILED APR. 23, 1909.
950,960.
Patented Mar. 1, 1910.
5 SHEETS—SHEET 5.
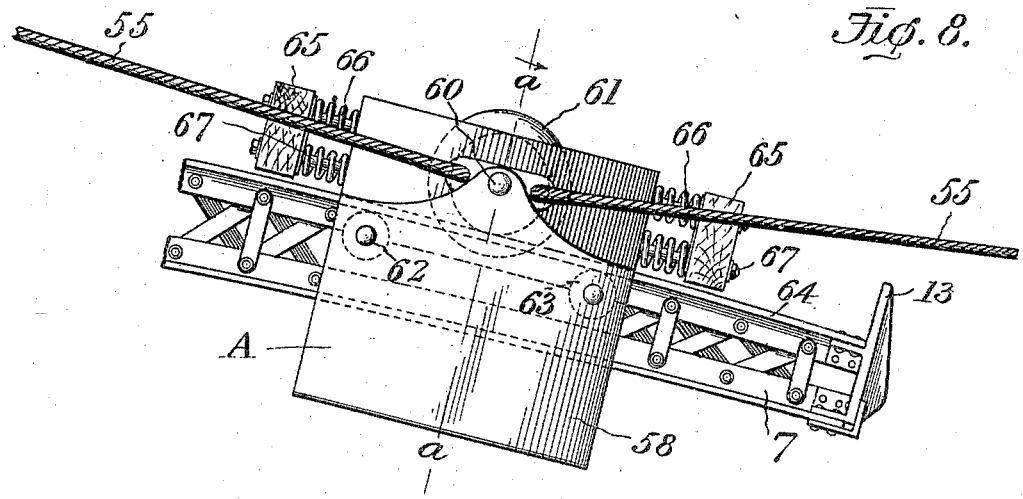
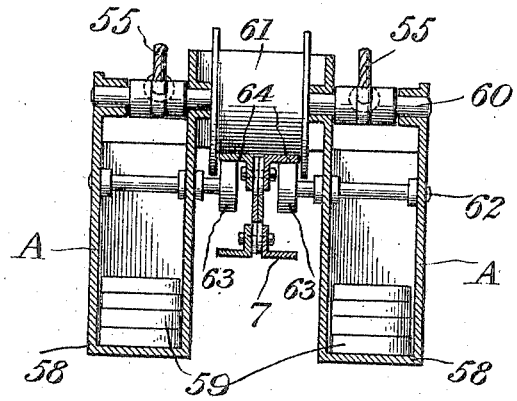
Witnesses
Fenton S. Belt
U. B. Hillyard
Inventor
Richard L. Sanders
By Victor J. Evans
Attorney

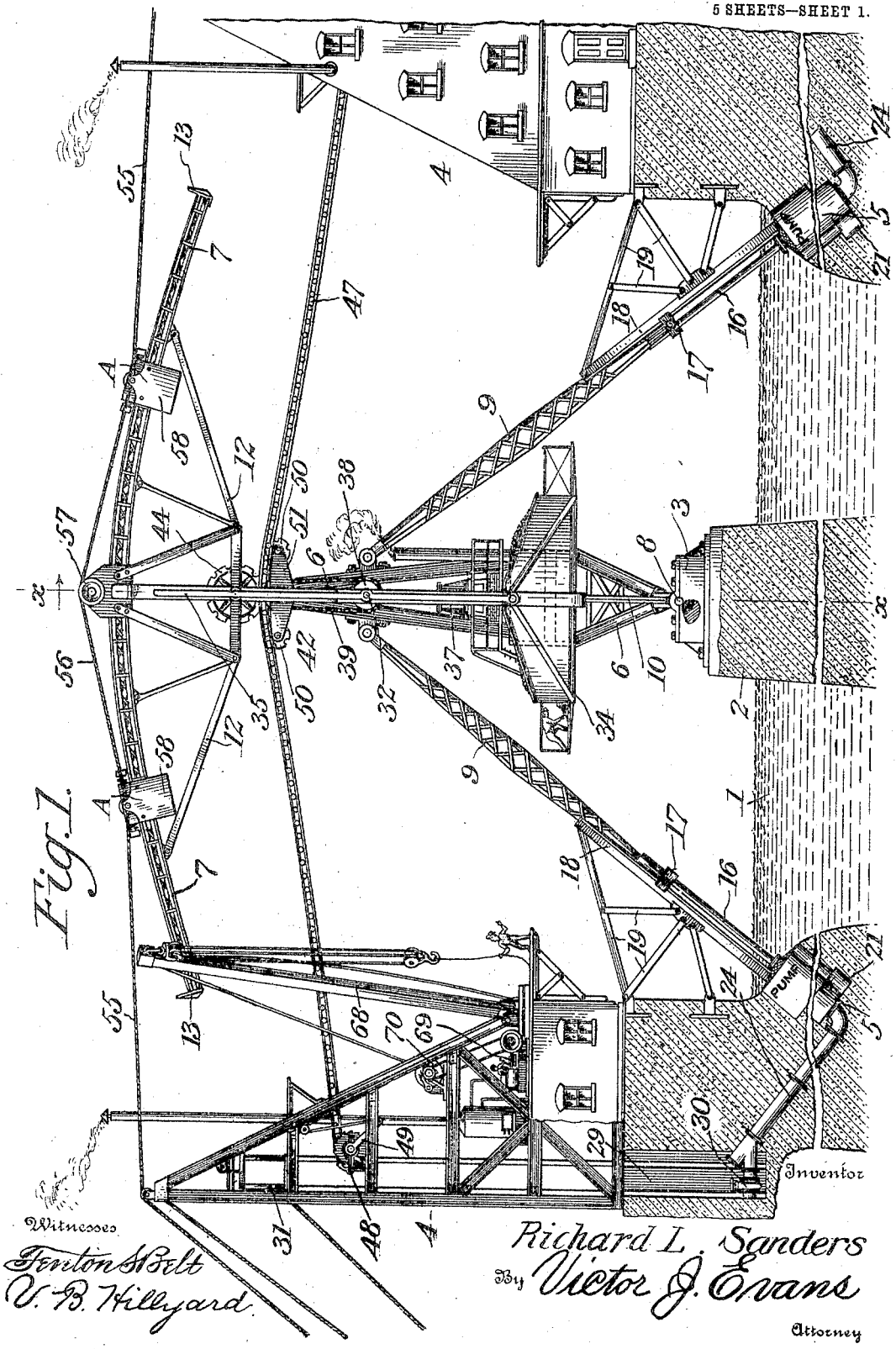

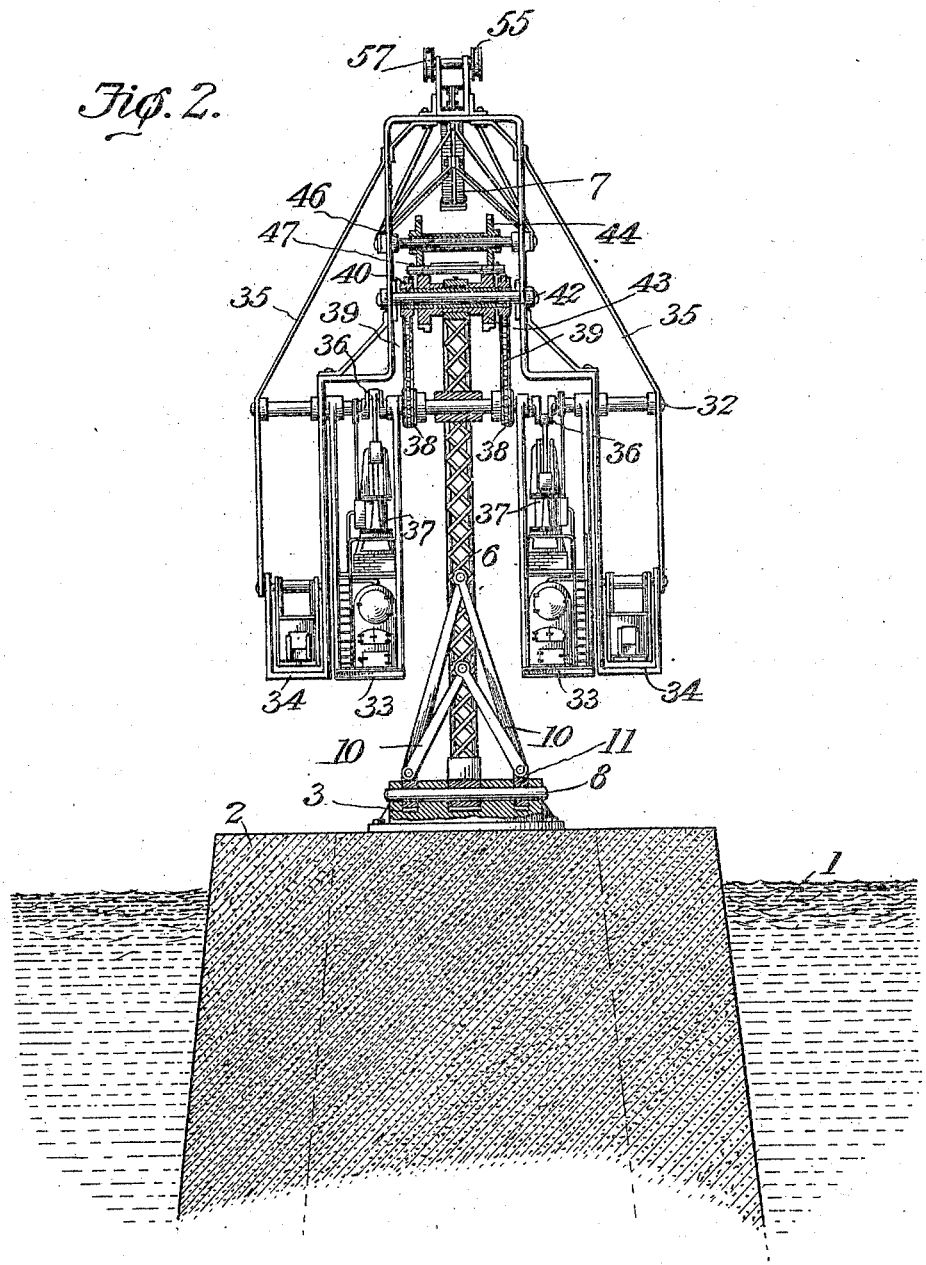

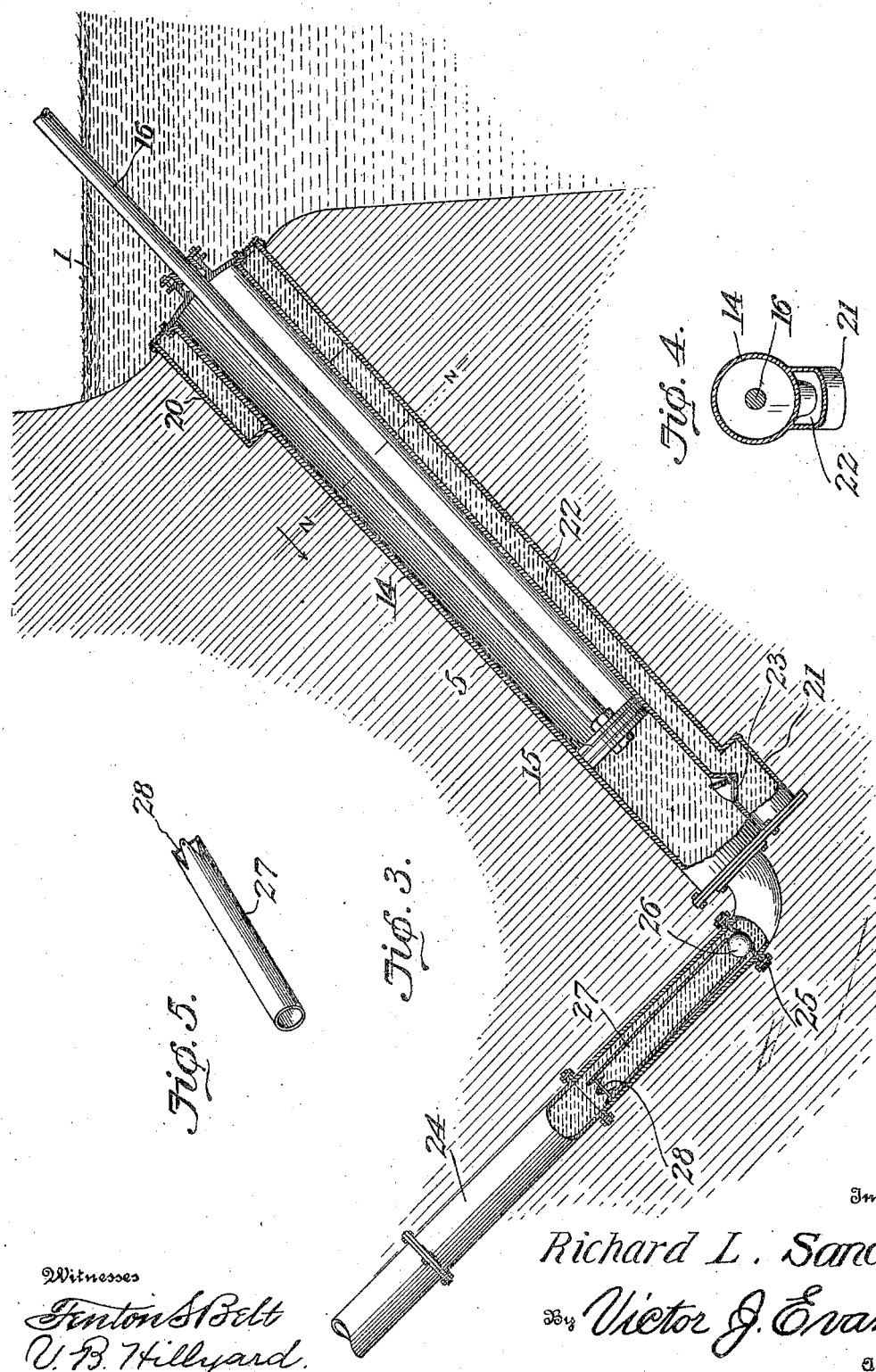

UNITED STATES PATENT OFFICE.

RICHARD L. SANDERS, OF BOWLING GREEN, MISSOURI.

WATER ELEVATOR AND DISTRIBUTER.

950,960. Specification of Letters Patent. Patented Mar. 1, 1910.

Application filed April 23, 1909. Serial No. 491,786.

*To all whom it may concern:*

Be it known that I, RICHARD L. SANDERS, a citizen of the United States, residing at Bowling Green, in the county of Pike and State of Missouri, have invented new and useful Improvements in Water Elevators and Distributers, of which the following is a specification.

The primary object of this invention is to supply a novel mechanism for raising water from streams, rivers, lakes and the like and forcing the same to desired points of use, being designed most especially for irrigating purposes in arid regions through which streams pass.

The invention also provides a mechanism which may be advantageously employed for supplying cities, villages and towns with water from neighboring streams, lakes or other bodies or rivers.

In its structural organization, the mechanism embodies a walking beam, pumps arranged upon opposite sides of the body of water, whether a stream, river or lake, an engine and accessories mounted upon the walking beam and movable therewith and adapted to effect oscillation thereof in the operation of the pumping mechanism to elevate and force the water to the required point of use, and means operating with the walking beam and actuating mechanism to effect positive movement of the walking beam in each direction when the machine is in active operation.

It is to be understood that the invention is susceptible of various changes and modifications within the scope of the appended claims, and that in adapting the invention to varying conditions and locations such changes in the structure and arrangement of parts may be resorted to without departing from the nature and scope of the invention.

The accompanying drawings illustrate one form and adaptation of the invention, and is illustrative of a construction to facilitate running of the machine and the making of needed repairs.

The invention consists of the peculiar construction, arrangement and combinations of parts which are illustrated in the drawings herewith, set forth in the following description and pointed out at length in the subjoined claims.

Referring to the drawings forming a part of the specification: Figure 1 is an elevation of a water elevating and distributing mechanism embodying the invention. Fig. 2 is a transverse section on the line $x$—$x$ of Fig. 1. Fig. 3 is a longitudinal section of one of the pumps on an enlarged scale, showing a portion of the discharge pipe coupled thereto. Fig. 4 is a section on the line $z$—$z$ of Fig. 3. Fig. 5 is a detail perspective view of the follower arranged in the discharge pipe and coöperating with the ball valve to insure proper seating of the same. Fig. 6 is a transverse section of a portion of the walking beam, and the element coöperating with the actuating mechanism to effect oscillation of the walking beam on the line $w$—$w$ of Fig. 7. Fig. 7 is a section on the line $y$—$y$ of Fig. 6. Fig. 8 is a view in elevation of one of the counterbalancing weights and an end portion of the cross member of the walking beam. Fig. 9 is a section on the line $a$—$a$ of Fig. 8.

Corresponding and like parts are referred to in the following description and indicated in all of the views in the drawings by the same reference characters.

The numeral 1 designates a body of water which may consist of a river, stream, lake or pond. A pier 2 is located about centrally of the body of water or midway between the banks thereof and is surmounted by a pillow block 3 which constitutes both a cap piece and a bearing for the walking beam.

Upon the banks or at opposite sides of the body of water 1 are erected towers or like structures 4 which may be of any design or finish adapted to house machinery generally employed in connection with water works or systems.

A pump 5 is located at each side of the body of water adjacent to the tower 4 and is embedded in the bank of masonry forming the bank or a bed to provide a substantial anchorage for the pump. The pumps 5 may be of any make or type embodying a barrel or cylinder and a piston arranged to operate therein.

The walking beam comprises an upright member 6 and a cross member 7. The members 6 and 7 may be of any construction and length and are preferably formed of angle bars transversely assembled and truss braced or otherwise strengthened and stiffened so as to sustain the weight and strain. The walking beam is mounted upon the pillow block 3 at 8 so as to receive an oscillatory movement between the oppositely disposed pumps and towers. Pitmen 9 connect the upright member 6 with the walking beam with the piston rods of the respective pumps. The walking beam is designed to be a massive and ponderous structure of considerable length, usually more than one hundred feet, the purpose being to actuate a pump having a great length or stroke. It will thus be understood that the component parts of the walking beam, such as the upright member 6 and the cross member 7 must be of substantial construction and firmly stayed so as to sustain the weight and load. As indicated in Figs. 1 and 2 the upright member 6 of the walking beam is braced both longitudinally and laterally, the latter braces being indicated most clearly in Fig. 2 by the reference numeral 10. The lower ends of the braces 10 are connected with collars 11 which are mounted upon the pin 8 pivotally connecting the walking beam to the pillow block 3. The cross member 7 is longitudinally curved approximately on the arc of a circle whose center corresponds with the axis 8 about which the walking beam oscillates. The cross member 7 is well trussed as indicated at 12 and is provided at opposite ends with stops 13. As indicated most clearly in Fig. 9, a series of four angle bars are employed in the formation of the cross member 7, said angle bars being arranged in upper and lower pairs in such manner as to provide upper and lower horizontal flanges.

Each pump 5 comprises a barrel 14 and a piston 15 arranged to operate within the barrel. The piston rod 16 is connected to a cross head 17 which is slidably mounted upon a guide 18, the pitman 9 being connected to the cross head 17. The arrangement is such as to insure a rectilinear movement of the piston rod in the operation of the pump. The guide 18 may be of any construction and is substantially strengthened by braces 19 connecting the same with the masonry along the bank of the body of water and forming a support for the tower and anchorage for the pump. A jacket 20 surrounds the upper portion of the barrel 14 and incloses a water space which opens into the body of water 1 below the level thereof at low tide. A screen or other protective means is applied to the receiving end of the water space to exclude fish, and other foreign matter from entering the water jacket and pump. A chest 21 is located at the lower end of the pump barrel and is connected by means of a passage 22 with the space inclosed by the water jacket 20. When the piston 15 moves toward the upper end of the barrel 14, the valve 23 opens and admits water passing from the chest 21 into the lower end of the barrel 14 and when the piston 15 is pressed downward into the lower end of the pump barrel, the valve 23 closes and the water is forced from the barrel 14 into a discharge pipe 24 which is connected with a water main or other pipe conveying the water to the required point of use according to the particular purpose for which the mechanism is provided. A diaphragm or plate 25 is clamped between sections of the discharge pipe 24 and is provided at a central point with an opening and which is closed by means of a ball valve 26. When the piston 15 moves toward the upper end of the pump barrel 14, the valve 26 is seated but when the piston 15 is moved toward the lower end of the pump barrel, the valve 26 is elevated from its seat thereby admitting of the water descending freely from the pump into the discharge pipe. To insure positive seating of the valve 26 a follower 27 is employed, the same consisting of a tubular body or short length of pipe, which is arranged loosely within the lower portion of the discharge pipe 24. The upper end of the hollow follower 27 is notched and the portions separated by the notches are connected by cross wires or rods 28, the purpose being to provide means whereby said follower may be removed when required by tackle or means such as usually employed for fishing tools from deep wells. The upper end of the discharge pipe 24 leads into a shaft 29 formed in the masonry or embankment of the body of water. The water-main connects with the upper portion of the discharge pipe 24 and the valve 30 is located so as to be reached from the shaft 29. A car 31 is adapted to be lowered into the shaft 29 so as to carry a workman to the bottom thereof when it is required to operate the valve 30 or to remove the follower 27 or valve 26 from the discharge pipe. The upper end of the discharge pipe 24 is adapted to be closed by a cap or other device which may be readily removed when access to the interior of the discharge pipe 24 is desired for any purpose.

Platforms are suspended from the walking beam and support the engine and accessory parts. In order to equalize the weight upon opposite sides of the walking beam, the platforms and engines are provided in duplicate. A horizontal shaft 32 is mounted transversely of the upright member 6 and projects an equal distance from opposite sides thereof. Platforms 33 and 34 are suspended from end portions of the shaft 32 by suitable hangers. The platforms 33 support the engines and steam boiler furnaces, whereas, the platforms 34 support the fuel bins. The platforms 33 and 34 are connected by extensions so that a person may pass from one to the other thereby enabling the fuel from the bin of the platform 34 being supplied to the furnace mounted upon the platform 33. The shaft 32 is braced at its outer ends by guides or stays 35 and is provided near opposite ends with crank portions 36 which are set quartering so as to obviate the engines stopping upon a dead center. The shaft 32 is adapted to be rotated by means of the engines 37 mounted upon the platform 33, said engines being connected with the cranks 36 in the usual manner. Sprocket wheels 38 are fast to the shaft 32 and are connected by sprocket chains 39 with sprocket wheels 40 fast to a sleeve 41 mounted upon a shaft 42 carried by the upper portion of the walking beam. The sleeve 41 is provided with sprocket wheels 43 fast thereto and adapted to coöperate with companion sprocket wheels 44 fast to a sleeve 45 mounted upon a shaft 46 located above the shaft 42 and supported by the walking beam or an extension of parts thereof. The sprocket wheels 43 and 44 have a vertical arrangement and are adapted to operate upon opposite sides of an element 47 which extends over the body of water 1 and in the plane of motion of the walking beam. The element 47 is relatively fixed and is connected at its ends to the towers or structures 4 in a manner to admit of any slack therein being taken up. The construction of the part 47 is such as to coöperate oppositely with the sprocket wheels 43 and 44 to insure the positive movement of the walking beam when the engines are in operation. While the precise structure of the part 47 is immaterial within the purview of the invention, nevertheless it is preferred to form the same of a number of links coupled to provide a chain, the cross bars of which make positive engagement with the sprocket wheels 43 and 44, the same having notches in their peripheries positioned so as to receive the cross bars of the coupled links forming the chain elements 47. A windlass or drum 48 is provided in each of the towers or structures 4 and has an end portion of the chain 47 wound thereon. A lever 49 connected with the shaft of the windlass or drum 48 is adapted to turn the drum to wind the chain or flexible connection 47 thereon to take up any slack therein. The lever 49 is of such construction as to have ratchet connection with the drum or windlass whereby an oscillatory or backward and forward movement of the lever 49 turns the windlass or drum to wind the part 47 thereon. Idlers 50 are mounted upon the end portions of a cross head 51 and are adapted to support the element 47 at each side of the sprocket wheels 43.

While as herein stated, the element 47 may be of any construction, it is preferred to form the same of pairs of cables 52 between which cross bars 53 are arranged and equally spaced, filling pieces 54 being interposed between the adjacent cross bars and clipped to the cables thereby joining the same and retaining the filling pieces in position. The ends of the filling pieces are notched so as to receive between them the cross bars 53. The filling pieces 54 may be blocks or castings. A pair of cables 52 are provided for each side so as to support the ends of the cross bars 53 which extend transversely a distance to pass between the coöperating sprocket wheels 43 and 44 as indicated most clearly in Fig. 6.

It is noted that when the upright member 6 of the walking beam occupies a perpendicular position the weight is uniformly distributed upon each side thereof. When the walking beam moves from the perpendicular, the weight is correspondingly shifted to one side and increases proportionately to the inclination of the walking beam to the vertical. In order to compensate for the shifting of the weight so as to preserve a practically uniform balance, counter-weights are supplied and these counter-weights are mounted upon end portions of the cross member 7 as indicated most clearly in Fig. 1. The counterbalancing weights A maintain a relatively fixed position and are held in place by means of one or more cables 55 which are connected at their ends to the structures or towers 4 or pass over supports thereon and are anchored to the ground at each side of the body of water 1. The central portion of the cables 55 is upwardly deflected as indicated at 56 and passes over guide pulleys 57 at the upper end of the walking beam or extension thereof. By reason of the fixed position of the counterbalancing weights A and the location of one upon each end portion of the cross member 7, it will be understood that as the walking beam moves from the perpendicular to one side or the other, the relative position of the counterbalancing weights A changes, that is, the counterbalancing weight upon the descending arm of the cross member 7 approaches the upright member 6 and the counterbalancing weight upon the ascending arm of the cross member 7 moves toward the extremity thereof with the result that the force of one counterbalancing weight decreases and the force exerted by the other counterbalancing weight increases upon the opposite side of the walking beam, thereby compensating for the increase of weight of the walking beam and adjunctive parts upon the descending side so as to practically equalize the weight. Upon the return movement of the walking beam, the conditions change, the effective force of the several weights decreasing upon one side and proportionately increasing upon the opposite side of the walking beam. It is to be remembered that the counterbalancing weights A are supported loosely by end portions of the cross member 7, the cables 55 simply holding said counterbalancing weights in a given position.

Each counterbalancing weight A comprises complemental parts of like formation as indicated most clearly in Fig. 9, each part consisting of a box or receptacle 58 in which a plurality of weights 59 are adapted to be placed. The boxes 58 are supported upon the ends of a rod or bar 60 which is provided with a pulley or grooved wheel 61 arranged to travel upon the upper side of the member 7. Shafts 62 are mounted in the sides of the boxes 58 and are provided at their inner ends with small wheels 63 adapted to engage under the horizontal flanges at the top side of the member 7 upon which the grooved wheel 61 travels. It will thus be understood that the construction is such as to prevent displacement of the boxes from the member 7, said weight boxes being directed in their movements and retained in place by the coöperating wheels 61 and 63. The flanges at the ends of the wheel 61 engage with the outer edges of the flanges 64 at the top of the member 7 thereby preventing transverse movement of the counter-balancing weights upon the member 7. Bumper blocks 65 are located at opposite ends of the counterbalancing weights and are connected with the framework thereof by means of springs 66 and rods 67. The bumper blocks 65 relieve the shock or jar incident to the stops at the ends of the member 7 and centrally of said member when coming in contact with the counterbalancing weights thereby preventing abnormal strain upon the cables 55.

A crane 68 is mounted upon the structure or tower 4 and may be used for lifting weights or for placing the several parts in position, or for transferring the engine from the platform to the tower when it is required to make repairs or for other purposes. An engine 69 located upon the structure is adapted to operate the hoisting tackle of the crane 68 or the lever 49 or the car 31. A windlass or drum 70 is mounted upon the structure or tower 4 in convenient position to be operated by the engine 69 and cables coöperate therewith and with the tackle of the several parts 31, 49 and 68 in the manner herein stated.

From the foregoing taken in connection with the accompanying drawings it will be understood that the invention supplies a mechanism that may be installed wherever a body of water is provided such as a lake, pond or stream to elevate the waters thereto and force the same to the required point of use either for irrigation or for supplying a city, village or town with water for domestic or industrial purposes. It is also observed that in the installation of the mechanism such changes may be made as the exigencies of the case may require in the adaptation of the same to location and existing conditions within the scope of the claims without departing from the spirit of the invention.

The gear elements 43 constitute drivers which act jointly with the element 47 to effect oscillatory movement of the walking beam.

It should be stated that in the operation of the apparatus, the engines are alternately driven in opposite directions, this being effected either by the reversing of the engines when the walking beam reaches the limit of its movement in each direction or the same result may be effected automatically by trip devices such as commonly employed in the mechanical arts for effecting a reciprocating movement of a traveling part.

Having thus described the invention, what is claimed is:

1. In means for elevating and distributing water, comprising a pump, and an approximately vertical walking beam for operating said pump, a counter-balancing weight mounted upon an arm of the walking beam, and means for holding said counter-balancing weight in a relatively fixed position whereby the weight upon opposite sides of the walking beam remains practically uniform at all positions of the walking beam during the stroke thereof.

2. In apparatus for elevating and distributing water, comprising a pump, and a walking beam connected with the pump for operating the same and comprising a horizontal member, counter-balancing weights mounted upon opposite end portions of the horizontal member of the walking beam, and means for holding said counter-balancing weights in a relatively fixed position so as to equalize the effective force of the weight upon opposite sides of the walking beam in the plane of movement at all stages of its stroke.

3. In apparatus for elevating water and effecting distribution thereof, comprising oppositely disposed pumps, and an intermediate walking beam connected with the respective pumps and comprising an approximately horizontal member, counter-balancing weights provided in pairs mounted upon the arms of the horizontal member of the walking beam, and the weights of each pair being arranged upon opposite sides of the walking beam, and means for connecting said counter-balancing weights to each other and to the fixed joints for holding said counter-balancing weights in fixed position whereby the effective force of the weights serves to counter-balance and to preserve an effective uniform weight upon opposite sides of the walking beam in the plane of movement thereof.

4. In water elevating and distributing apparatus comprising opposite disposed pumps, and a centrally disposed walking beam connected with the respective pumps and comprising an upright member and a cross member, the latter being curved on the arc of a circle and having its center corresponding approximately with the center of movement of the walking beam, counter-balancing weights mounted upon opposite ends of the walking beam cross member, and means for holding said counter-balancing weights in fixed position, each counter-balancing weight comprising like members located upon opposite sides of the walking beam, and provided with movable weights.

5. In water elevating and distributing apparatus comprising a pump, a walking beam connected with said pump, said walking beam consisting of an upright member, and a cross member, the latter having stops in its length, counter-balancing weights mounted upon opposite end portions of the cross member, means for holding the counter-balancing weights in fixed position, and bumpers at opposite ends of the counter-balancing weights to connect with the stops provided upon the said cross member to relieve the parts of injurious strain.

6. In water elevating and distributing apparatus, the combination of a pump, a walking beam connected with the pump for operating the same, a driver mounted upon the walking beam, and a connection located in the plane of movement of the walking beam and coöperating with said driver to effect movement of the walking beam.

7. In means for elevating and distributing water, the combination of a pump, a walking beam connected with the pump for operating the same, an engine mounted upon the walking beam, a driver connected with the engine, and a connection arranged in the path of movement of the walking beam and adapted to coöperate with said driver to effect a positive movement of the walking beam.

8. In water elevating apparatus, comprising a pump, a walking beam connected with the pump for operating the same, an engine mounted upon the walking beam, a driver likewise mounted upon the walking beam and receiving power from said engine, an element arranged in the path of movement of the walking beam and comprising cables and connecting cross bars, the latter adapted to be engaged by said driver, and a member coöperating with the driver to prevent displacement of the cross bars of the said element coöperating therewith.

9. In water elevating apparatus, comprising a pump, and a walking beam connected with the pump for operating the same, an engine mounted upon the walking beam, a sprocket wheel mounted upon the walking beam, and connected with the engine to be driven thereby, a flexible member extending in the plane of movement of the walking beam and comprising side cables and cross bars, the latter adapted to be positively engaged by said sprocket wheel to prevent disengagement of the cross bars of said coöperating element therefrom.

10. In water elevating apparatus, comprising a pump, a walking beam connected with the pump for operation thereof, a platform suspended from the walking beam, an engine mounted upon said platform, and means coöperating with said engine and actuated thereby to impart movement to the walking beam.

11. In water elevating apparatus comprising a pump, and a walking beam connected with the pump, an engine suspended from the walking beam, a driver mounted upon the walking beam and receiving motion from said engine, a flexible connection located in the plane of movement of the walking beam and comprising cross bars in engagement with said driver, and a companion member coöperating with the driver to prevent displacement of the member coöperating therewith.

12. In apparatus of the character specified comprising a pump, and a walking beam having connection with the pump for operating the same, an engine suspended from the walking beam, means coöperating with the engine to effect an oscillatory movement of the walking beam, and relatively fixed counter-balancing weights mounted upon end portions of the walking beam to equalize the weight upon opposite sides thereof when the same is in operation.

13. In apparatus of the character set forth, comprising a pump, a walking beam connected with the pump for operating the same, an engine mounted upon the walking beam, a gear wheel connected with the engine to be driven thereby, a second gear wheel connected with the first-mentioned gear wheel, and a coöperating member located in the plane of movement of the walking beam, and acting jointly with said second gear wheel to effect movement of the walking beam.

14. In apparatus of the character set forth, comprising a pump, a walking beam connected with said pump, an engine suspended upon the walking beam, connected gear wheels mounted upon the walking beam and adapted to be driven by means of said engine, a coöperating member located in the plane of movement of the walking beam comprising side cables and connecting cross bars, the latter being adapted to act jointly with said connected gear wheels to effect movement of the walking beam, and counterbalancing weights coöperating with the walking beam to equalize the weight upon opposite sides thereof at all stages of its movement.

In testimony whereof I affix my signature in presence of two witnesses.

RICHARD L. SANDERS.

Witnesses:
J. D. HOSTETTER,
ZOULA PEAY.